PRECISION MINIATURE ANALOGUE-TO-DIGITAL CONVERTER

Filed Oct. 27, 1961

3 Sheets-Sheet 1

INVENTOR.

MANUEL SELVIN

BY Henry L. Shenier

ATTORNEY

Oct. 4, 1966 M. SELVIN 3,277,461

PRECISION MINIATURE ANALOGUE-TO-DIGITAL CONVERTER

Filed Oct. 27, 1961

3 Sheets-Sheet 2

INVENTOR.
MANUEL SELVIN

BY Henry W. Shaner

ATTORNEY

INVENTOR.
MANUEL SELVIN
BY Henry L. Shenier
ATTORNEY

United States Patent Office 3,277,461

Patented Oct. 4, 1966

3,277,461

PRECISION MINIATURE ANALOGUE-TO-DIGITAL CONVERTER

Manuel Selvin, Norwalk, Conn., assignor to United Aircraft Corporation, East Hartford, Conn., a corporation of Delaware Filed Oct. 27, 1961, Ser. No. 148,208

7 Claims. (Cl. 340—347)

My invention relates to an analogue-to-digital converter and more particularly to a precision miniature analogue-to-digital converter which is especially adapted to produce an accurate, digital indication of a shaft position angle.

In many instances it is necessary that an extremely accurate indication of shaft position angle be produced. Not only must the indication be accurate but also it is desirable that the indication be in digital form to permit it to be fed directly to a computer for processing. There are known in the prior art devices for producing a digital indication of shaft position angle. These devices usually incorporate code wheels which in response to displacement of the shaft produce a digital output indicative of the angular position of the shaft with reference to an arbitrarily selected zero position. In many instances it has not proven practicable to use these code wheel devices on the shaft, the angular position of which it to be measured. For example, it has not proven mechanically feasible to mount such devices directly on the gimbals of a stable platform. Another instance in which these devices cannot satisfactorily be used is on the shafts of accelerometers.

I have invented a precision miniature anologue-to-digital converter for producing a digital indication of the angular position of a shaft. My converter is especially adapted for use on installations in which the code wheel converters of the prior art cannot successfully be employed. My converter produces a highly precise digital representation of shaft position angle. The operation of my converter is extremely rapid as compared with that of mechanical servo systems. My system is such that much of the equipment employed therein can be time-shared. My system requires very little additoinal equipment over that normally available in the usual digital computer. My converter employs no moving parts.

One object of my invention is to provide a precision miniature analogue-to-digital converter for producing a digital representation of the angular position of a shaft.

Another object of my invention is to provide a precision miniature analogue-to-digital converter which generates a very precise digital output.

A further object of my invention is to provide a precision miniature analogue-to-digital converter which is extremely rapid in operation.

Still another object of my invention is to provide a precision miniature analogue-to-digital converter, many of the components of which can be time-shared.

A still further object of my invention is to provide a precision miniature analogue-to-digital converter which incorporates no moving parts.

Yet another object of my invention is to provide a precision miniature analogue-to-digital converter which requires very little additional equipment over that available in the usual digital computer.

Other and further objects of my invention will appear from the following description.

In general my invention contemplates the provision of a precision miniature analogue-to-digital converter in which I sequentially feed the output signals of a resolver and inductosyn driven by the shaft, whose angular position is to be measured, through a voltage analogue-to-digital converter to respective storage circuits. Using these stored values, I digitally compute either a tangent or a cotangent function lying within a sector of 45°. From the tangent or cotangent function and with signals indicating the signs of the sine and cosine stored signals and a signal indicating whether a tangent or cotangent has been generated, I calculate digital coarse and fine angle indications which overlap and combine these indications to produce the desired digital representation of angle.

In an alternate form of my invention applicable to an accelerometer, I employ only a resolver and associated logic circuitry to generate the required digital representation of angle.

In the accompanying drawings which form part of the instant specification and which are to be read in conjunction therewith and in which like reference numerals are used to indicate like parts in the various views.

Figure 1:
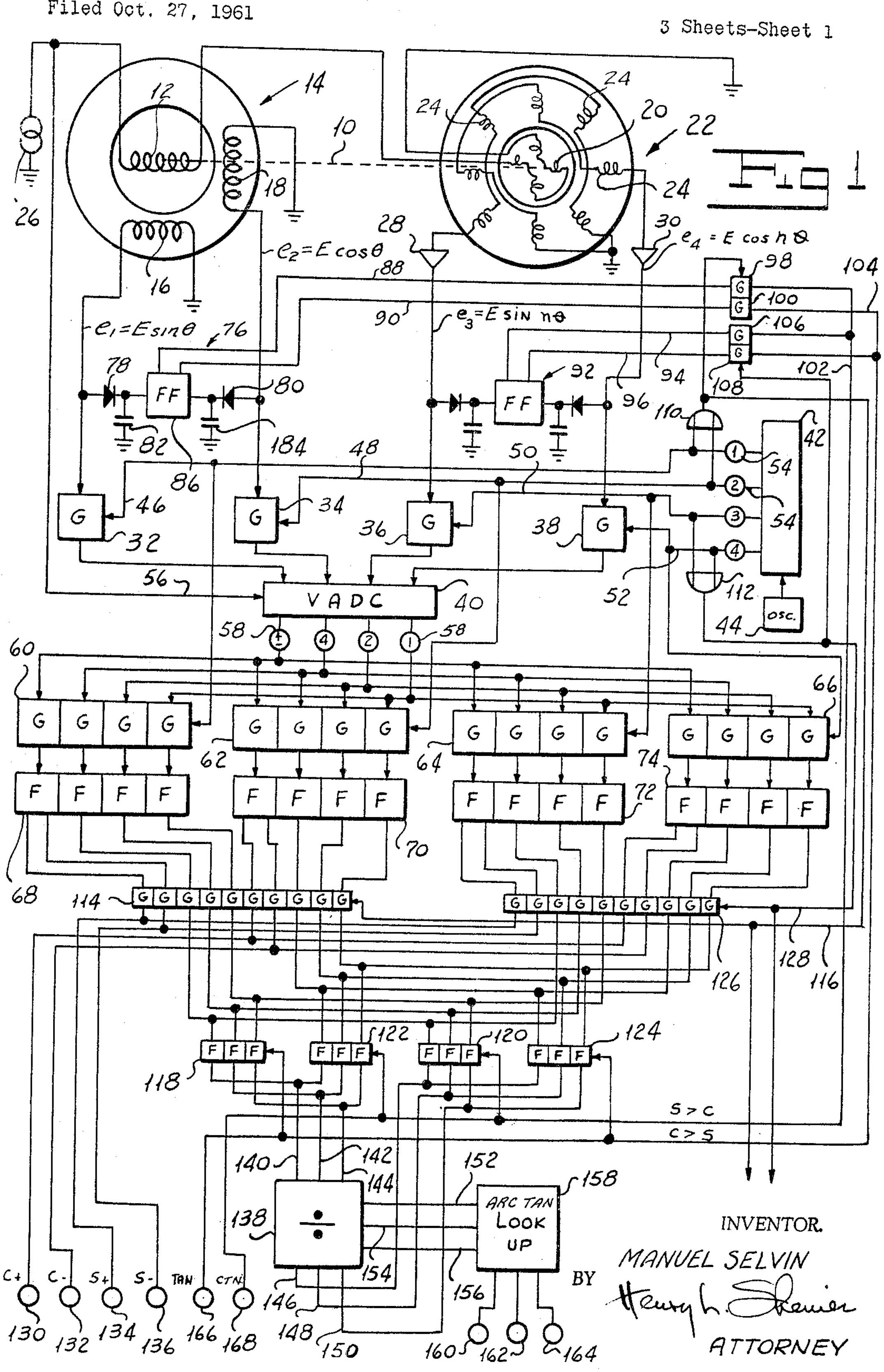
FIGURE 1 is a schematic view of one portion of my precision miniature analogue-to-digital converter.
Figures 2, 6:
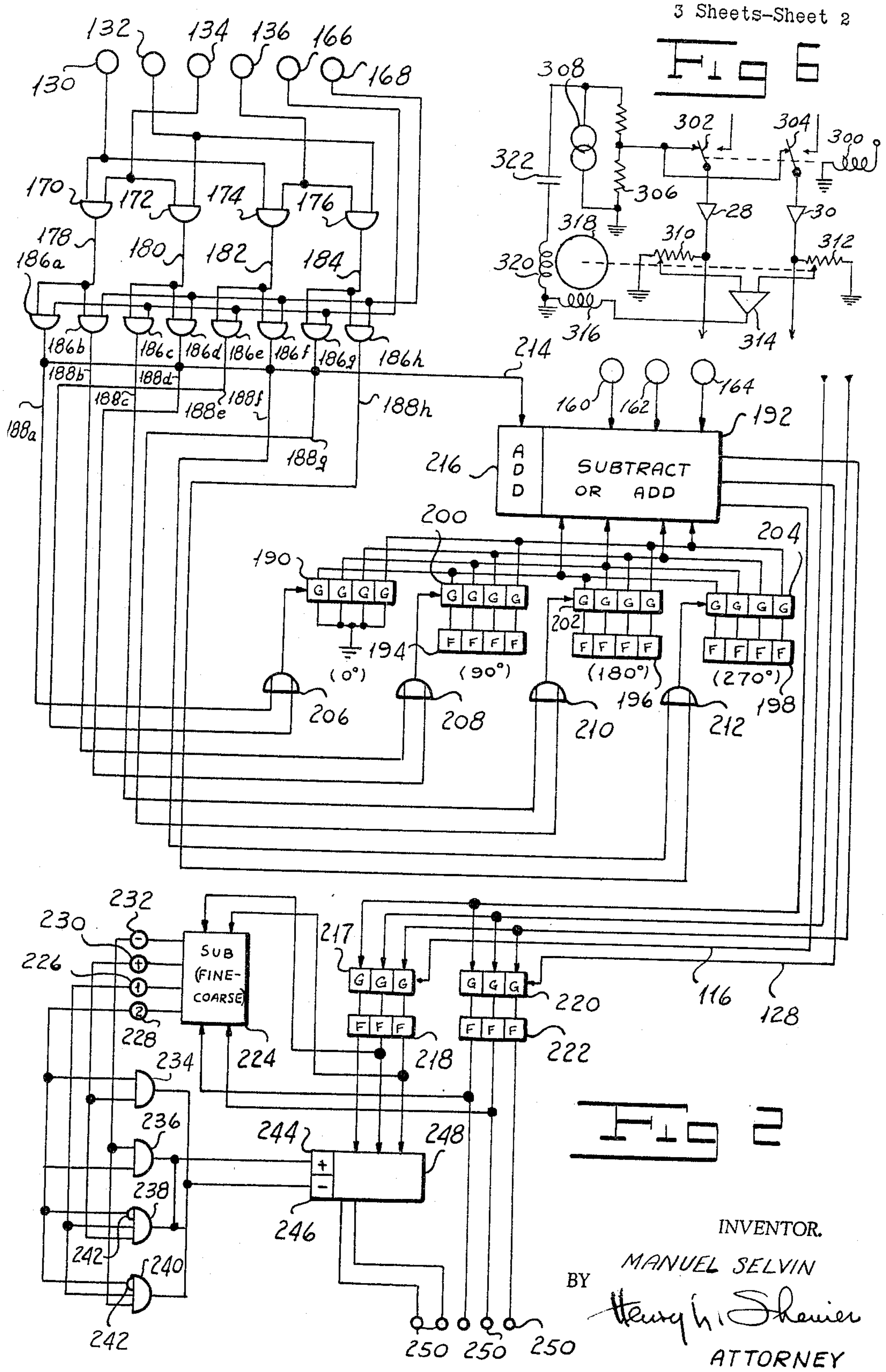
FIGURE 2 is a schematic representation of the remainder of my precision miniature analogue-to-digital converter.
FIGURE 6 is a schematic view of a circuit for calibrating the inductosyn output amplifier of my precision miniature analogue-to-digital converter.

Referring now to FIGURES 1 and 2 of the drawings, the shaft 10 whose position is to be measured drives the rotor 12 of a resolver, indicated generally by the reference character 14, having stator windings 16 and 18. Shaft 10 also drives the rotor winding coils 20 of an inductosyn, indicated generally by the reference character 22, and having a plurality of stator winding coils 24. As is known in the art, in the actual construction of an inductosyn the coils such as 20 and 24 are formed by metallic deposits in the form of hairpin turns on insulating discs or plates. I connect the rotor windings 12 and 20 in series between a suitable source 26 of alternating current voltage E and ground. As is known in the art, in response to the application of this voltage E to the rotor winding 12 of the resolver the output windings produce respective signals $e_1=E \sin \theta$ and $e_2=E \cos \theta$. Similarly, the two groups of inductosyn stator winding coils produce respective output signals $e_3=E \sin n\theta$ and $e=E \cos n\theta$ where $n$ is the number of poles of the inductosyn. Owing to the fact that the transformation ratio of the inductosyn is very small, it is necessary to employ respective amplifiers 28 and 30 in the inductosyn output circuits.

I feed the respective resolver and inductosyn output signals to gating circuits 32, 34, 36 and 38 adapted to be activated to pass the signals to a voltage analogue-to-digital converter 40 of any suitable type known to the art. My system includes a scale-of-four counter 42 supplied from an oscillator 44 and adapted to produce a series of groups of four respective pulses each on conductors 46, 48, 50 and 52. For purposes of clarity I have designated the output terminals 54 of the counter 42 in the figure as 1, 2, 3, and 4. I apply the respective pulses on channels 46, 48, 50 and 52 to the triggering input terminals of gates 32, 34, 36 and 38 sequentially to pass the resolver and inductosyn outputs to the converter 40. I feed the reference voltage from source 26 to the converter 40 through a channel 56. As is known in the art, in response to an analogue input signal converter 40 produces a digital output representation at a plurality of terminals 58 representing the magnitude of the analogue input signal to the converter as well as the sign of this signal. I feed the output digital signals on terminals 58 to a plurality of respective banks 60, 62, 64 and 66 of gating circuits triggered respectively by the pulses on channels 46, 48, 50 and 52. These banks of gating circuits feed respective banks 68, 70, 72 and 74 of flip-flops adapted to store the digital representations of the analogue voltages as well as representations of the signs of the digital outputs.

The result of the operation pust described is that bank 68 stores a digital representation of the magnitude of sine $\theta$ as well as the sign. Bank 70 carries a digital representation of cosine $\theta$ and its sign. Bank 72 carries a digital representation of sine $n\theta$ and its sign. Bank 74 carries a digital representation of cosine $n\theta$ and its sign. Using these stored values, I next calculate a value of tangent or cotangent $\theta$ and $n\theta$ and from these values coarse and fine angle representations $\theta$ and $n\theta$. In order to determine whether the tangent or cotangent is to be calculated, I first determine which of sine $\theta$ and cosine $\theta$ is greater and which if sine $n\theta$ and cosine $n$ is greater. I feed the respective signals from the resolver 14 to a comparator circuit, indicated generally by the reference character 76, comprising crystals 78 and 80 and capacitors 82 and 84. In response to the signals from the resolver capacitors 82 and 84 store potentials which are applied to a flip-flop circuit 86 which produces an output signal on a conductor 88 when sine $\theta$ is greater than cosine $\theta$ and which produces a signal on a conductor 90 when cosine $\theta$ is greater than sine $\theta$. In a similar manner I apply the output signals of the inductosyn amplifiers 28 and 30 to a comparison circuit 92 which produces a signal on a conductor 94 when sine $n\theta$ is greater than cosine $n\theta$ and a signal on a conductor 96 when cosine $n\theta$ is greater than sine $n\theta$. Respective gating circuits 98 and 100 are adapted to be actuated to pass the signals on conductors 88 and 90 to conductors 102 and 104. Gating circuits 106 and 108 are adapted to be actuated to pass the signals on conductors 94 and 96 to conductors 102 and 104. As will be apparent from the description given hereinafter, I use the signals on conductors 88 and 90 during only the first two counts of counter 42 and I use the signals on conductors 94 and 96 only during the third and fourth counts of counter 42. For this reason a two input OR circuit 110 passes the counts on conductors 46 and 48 to gating circuits 98 and 100 to activate these circuits during the first two counts. A two input OR circuit 112 passes the counts on conductors 50 and 52 to the triggering input terminal of gates 106 and 108 during the third and fourth counts.

A bank 114 of gating circuits adapted to be actuated by the output of OR circuit 110 through a conductor 116 passes the respective magnitude output signals of flip-flops 68 and 70 to sine storage flip-flop banks 118 and 120 and to cosine storage flip-flop banks 122 and 124. A bank 126 of gating circuits activated by the output of OR circuit 112 through a conductor 128 passes the stored magnitude representations in flip-flop 72 and 74 to the sine flip-flop storage banks 118 and 120 and to the cosine storage flip-flop banks 122 and 124. One gate of each of the banks 114 and 116 passes a signal to a terminal 130 when the cosine is plus. Another gate of each of the banks 114 and 126 passes a signal to a terminal 132 when the cosine is negative. Similarly gates of the banks 114 and 126 pass signals respectively to a terminal 134 when the sine is plus and to a terminal 136 when the sine is negative.

I feed the stored digital values in the banks 118, 120, 122 and 124 to a dividing circuit 138 in such manner that the larger representation always is divided into the smaller. Thus, when the sine is greater than the cosine as indicated by the presence of a signal on conductor 102, I trigger the bank 122 to feed the cosine representation contained therein to the dividend input channels 140, 142 and 144 of network 138. At the same time I trigger the bank 120 to feed the representation contained therein to the divisor input channels 146, 148 and 150 of the network 138. It will be appreciated that when this is done the representation appearing on the output channels 152, 154 and 156 of the network 138 is a cotangent function. When the cosine is greater than the sine, as indicated by the presence of a signal on conductor 104, I trigger the bank 118 and the bank 124 to feed their representations respectively to the divided input and to the divisor input of the network 138. In this case the output on channels 152, 154 and 156 represents a tangent function. I apply the digital representation on channels 152, 154 and 156 to a look-up device 158 such as a suitable matrix or arbitrary function generator which in response to a digital input representing a function produces an output at terminals 160, 162 and 164 which is a digital representation of the angle whose function is fed into the device 158. I connect conductor 102 to a terminal 166 to indicate that a tangent function has been generated when conductor 102 carries a signal. Similarly, I connect conductor 104 to a terminal 168 to indicate that a cotangent function has been generated when conductor 104 carries a signal.

Figures 3, 4, 5, 7:
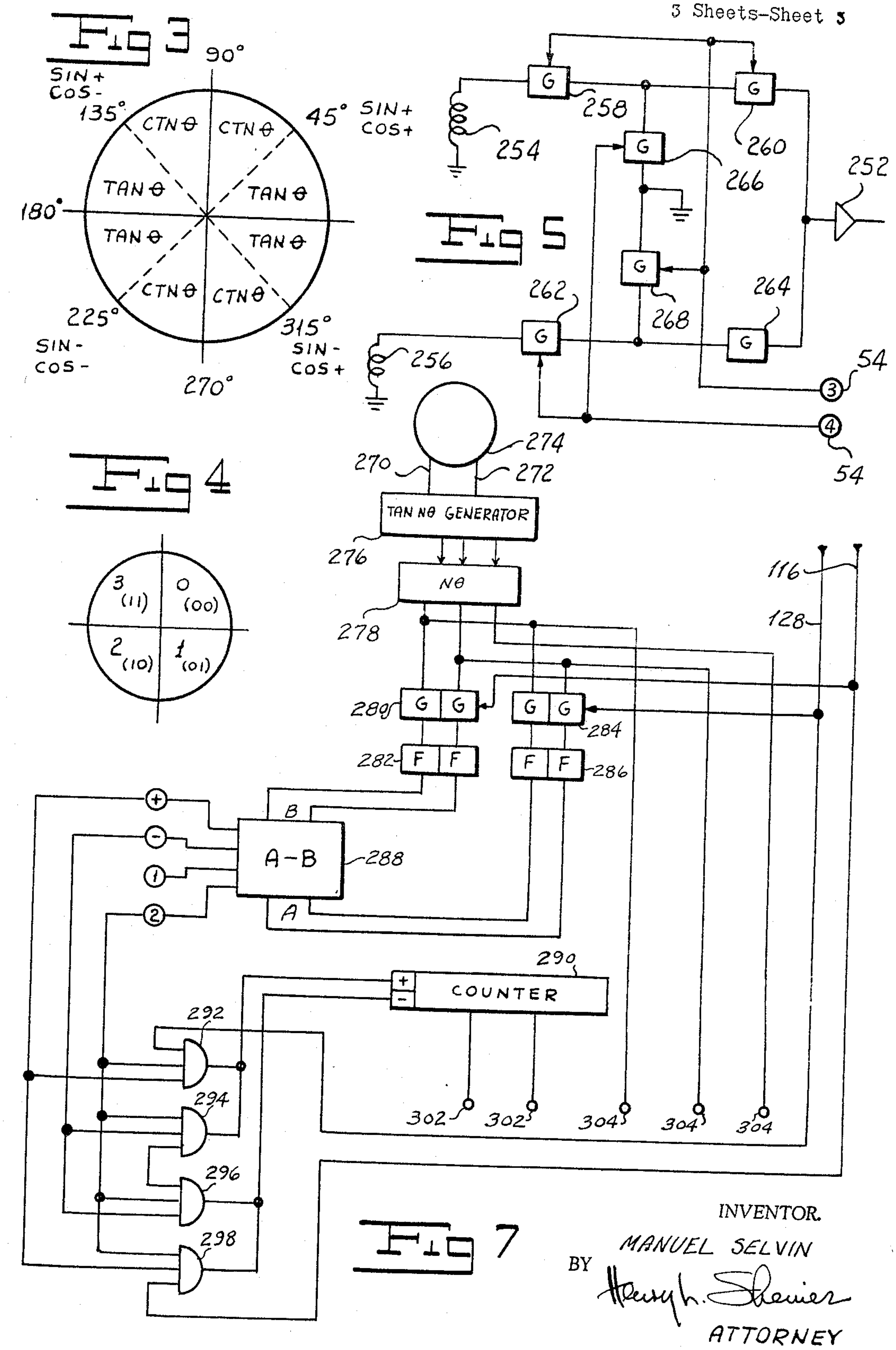
FIGURE 3 is a diagram illustrating the functions I generate in eight respective sectors of one revolution of the shaft whose position is being measured.
FIGURE 4 is a diagram illustrating the manner in which I eliminate ambiguities in the overlapping coarse and fine outputs of my precision miniature analogue-to-digital converter.
FIGURE 5 is a schematic view illustrating one circuit which may be employed in my precision miniature analogue-to-digital converter to produce time-sharing of the inductosyn output amplifier.
FIGURE 7 is a schematic view of an alternate form of my invention as applied to an accelerometer.

From the foregoing it will be seen that I now have available a representation of the magnitude of an angle at terminal 160, 162 and 164. Terminals 130, 132, 134 and 136 indicate the sign of the sine and cosine of the angle while terminals 166 and 168 indicate whether a tangent or cotangent was generated. With these signals I am able to determine in which of eight sectors the angle lies. Referring to FIGURE 3, if, for example, I generated a tangent and both the sine and cosine are positive then the angle lies between zero and 45°. In this case the actual angle can be determined merely by adding the calculated representation to 0°. If, however, I have generated a cotangent function and both the sine and cosine are plus, then in order to find the actual angle I subtract the angular representation from 90°. Thus, by using the available signals I can calculate the actual angular position of the shaft 10. For purposes of simplicity, in Table I below I have indicated the operation which must be performed where the calculated angle lies in each one of the eight sectors.

*Table I*

| sin + | sin − | cos + | cos − | tan | ctn | Operation | Sector |
|---|---|---|---|---|---|---|---|
| / | | / | | / | | Add to 0° | 0°–45° |
| / | | / | | | / | Sub. from 90° | 45°–90° |
| / | | | / | | / | Add to 90° | 90°–135° |
| / | | | / | / | | Sub. from 180° | 135°–180° |
| | / | | / | / | | Add to 180° | 180°–215° |
| | / | | / | | / | Sub. from 270° | 225°–270° |
| | / | / | | | / | Add to 270° | 270°–315° |
| | / | / | | / | | Sub. from 0° | 315°–360° |

Referring now to FIGURE 2, I have shown terminals corresponding to the terminals of FIGURE 1 carrying the signals necessary for determining in which of the eight sectors the angle lies and the terminals carrying the representation of the magnitude of the angle. I connect terminals 130, 132, 134 and 136 to a plurality of two input AND circuits 170, 172, 174 and 176 so that the output channels 178, 180, 182 and 184 of these circuits respectively represent that both sine and cosine are positive, that the sine is positive and the cosine is negative, that the sine is negative and the cosine is positive and that both the sine and the cosine are negative. I apply the signals on channels 178, 180, 182 and 184 as well as the signals at terminals 166 and 168 to a plurality of two input AND circuits 186*a* to 186*h* so that the respective output channels 188*a* to 188*h* of these AND circuits represent the conditions for the eight sectors indicated in FIGURE 3.

Considering ground to indicate the condition of 0° displacement of shaft 10, a bank 190 of gating circuits is adapted to apply this representation to an add or subtract circuit 192 to which I also apply the representation at terminals 160, 162 and 164. Respective banks of storage circuits 194, 196 and 198 carry representations of 90°, 180° and 270°. Banks 200, 202 and 204 of gating circuits are adapted to be actuated respectively to pass the stored representations in banks 194, 196 and 198 to the add-or-subtract circuit 192. I apply the outputs on channels 188*a* to 188*h* to a plurality of two input OR circuits 206, 208, 210 and 212 associated with the banks 190, 200, 202, and 204 in such manner that in accordance with Table I the proper reference value is fed to the circuit 192. The arrangement of this circuit is such that in its normal operation it subtracts the representation on terminals 160, 162 and 164 from the reference value fed thereto. Where it is necessary that the calculated angular representation be added to the reference, I apply a signal from the proper AND circuit 186 through a conductor 214 to a section 216 of the device 192 to cause it to add rather than to subtract.

As a result of the operation just described, during the first and second output pulses from counter 42 the circuit 192 produces a coarse digital representation of angle which is fed through a bank 217 of gating circuits responsive to the signal on conductor 102 to a bank 218 of storage flip-flops. Similarly, during the third and fourth pulses from the counter 42 the circuit 192 produces a fine digital representation which is fed through a bank 220 of gates responsive to a signal on conductor 104 to storage flip-flops 222.

In order to avoid the possibility of ambiguity in the output of my system, I compare the two most significant place bits of the fine representation in flip-flops 222 with two two least significant place bits in the coarse indication in flip-flops 218. By subtracting the fine representation from the coarse representation in these bit places, the proper correction can be arrived at. Referring to FIGURE 4, by way of example it will be seen that, assuming there can only be an error of 1 there are four possibilities. If the fine representation is zero, then the coarse representation can be 3, 0 or 1. If the fine representation is 1 then the coarse representation can be 0, 1 or 2. If the fine representation is 2 then the coarse representation can be 1, 2 or 3. If the fine representation is 3 then the coarse representation can be 2, 3, or 0. Considering the first of the cases outlined above, if the fine representation is 0 and the coarse representation is 0 no correction need be applied to the coarse representation to make it agree with the fine. If, however, the fine representation is 1 and the coarse representation is 0 then the coarse representation can be made to agree with the fine representation by subtracting 1 from the coarse. If the fine representation is 0 and the coarse representation is 3 it would seem that the correction should be made by subtracting 3 from the coarse representation to make it agree with the fine. From the diagram shown in FIGURE 4, however, it will readily be apparent that the correction can be made more expeditiously by adding 1 to the coarse representation to make it 0, thus to agree with the fine. In this manner corrections can be made for all the possible situations of coarse and fine representations. For purposes of simplicity, I have outlined all these situations and the required corrections in Table II below:

*Table II*

| Coarse | | Fine | | Operation on Coarse |
|---|---|---|---|---|
| Bin. | Dec. | Bin. | Dec. | |
| 11 | 3 | 00 | 0 | Add 1 |
| 00 | 0 | 00 | 0 | |
| 01 | 1 | 00 | 0 | Sub 1 |
| 00 | 0 | 01 | 1 | Add 1 |
| 01 | 1 | 01 | 1 | |
| 10 | 2 | 01 | 1 | Sub 1 |
| 01 | 1 | 10 | 2 | Add 1 |
| 10 | 2 | 10 | 2 | |
| 11 | 3 | 10 | 2 | Sub 1 |
| 10 | 2 | 11 | 3 | Add 1 |
| 11 | 3 | 11 | 3 | |
| 00 | 0 | 11 | 3 | Sub 1 |

My system incorporates logic circuitry to achieve the result outlined above in Table II. Referring again to FIGURE 2 I feed the representation in the two least significant places of flip-flops 218 to one input of a subtracting network 224. I feed the representations in the two most significant places in the bank 222 to the other input of network 224. The operation of this network is such that it subtracts the coarse representations from the fine to produce an output at a terminal 226 when the difference is 1, to produce an output at a terminal 228 when the difference is 2 and to produce outputs at both of these terminals where the difference is 3. Respective output terminals 230 and 232 carry signals indicating the sign of the difference. I feed the signals on terminals 226, 228, 230 and 232 to a plurality of AND circuits 234, 236, 238 and 240 in such manner as will generate the correct output signals in accordance with Table II above. It is to be noted that each of the AND circuits 238 and 240 includes an inhibit input terminal 242 which prevents these circuits from producing an output when circuit 224 puts out a 3 so that the correction can be achieved simply by adding or subtracting 1 in the manner set forth hereinabove. I feed the outputs of the AND circuits to one of two input sections 244 and 246 of a network 248 adapted to add 1 or subtract 1 from the coarse representation which is fed to the circuit. In this manner I avoid possible ambiguities in the output of my system appearing at a plurality of terminals 250.

Referring now to FIGURE 5, I have shown an example of one way in which I can time-share an amplifier 252 for both of the inductosyn outputs. For purposes of convenience I have indicated the respective inductosyn output windings by coils 254 and 256. Respective gating circuits 258 and 260 are adapted to produce a series path from winding 254 to the amplifier 252. Similarly, respective gating circuits 262 and 264 are adapted to provide a series path from winding 256 to amplifier 252. Respective gating circuits 266 and 268 are adapted to be actuated to connect the common terminal of gating circuits 258 and 260 to ground and to connect the common terminal of gating circuits 262 and 264 to ground. In this manner even though the gating circuits have some leakage impedance in their off state the signal generated by the output of the winding which is not directly connected to amplifier 252 will not appreciably affect this signal being fed from the other winding to the amplifier. I apply third pulse appearing at a terminal 54 to gate the circuits 258 and 260 on and to gate circuit 268 on to apply the signal on winding 254 to amplifier 252 while preventing the signal on winding 256 from appreciably affecting the signal applied to amplifier 252. In a similar manner I apply the fourth pulse at terminal 54 to the gating circuits 262 and 265 and to gating circuit 266 to feed the signal on winding 256 to amplifier 252 while preventing the signal on winding 254 from appreciably affecting the voltage fed to amplifier 252. This time-sharing of the amplifier 252 by the two resolver outputs has the additional advantage that it obviates the necessity for balancing two output amplifiers of the inductosyn.

Owing to the fact that the signal levels of the inductosyn outputs are low the time-sharing of an output amplifier in the system proposed in FIGURE 5 may not operate as satisfactorily as in desirable. Referring now to FIGURE 6 I have shown an alternate form of inductosyn output in which I periodically switch the input circuits of amplifiers 28 and 30 to a reference potential, compare them and vary the gains of the amplifiers to compensate for the difference. In the circuit shown in FIGURE 6 for accomplishing the result I apply a calibrating pulse periodically to a relay winding 300 to operate ganged switches 302 and 304 to apply a calibrating voltage on a divider 306 supplied by a source 308 to the input circuits of amplifiers 28 and 30. The output circuits of the amplifiers are provided with potentiometers 310 and 312. A difference amplifier 314 fed by the potentiometers supplies one winding 316 of a motor 318 the other winding 320 of which is supplied by a capacitor 322 from the source. Where there exists a difference in gain of the amplifiers motor 318 drives the potentiometer to reduce the difference to zero. It is to be understood that other specific arrangements could be provided for achieving this result. For example, flip-flops shunting resistors could be used to effect the amplifier gain charge. Also the error could be digitized and used to correct one of the outputs such as the sine or cosine. Both outputs could be digitized and the result stored and used to correct the tangent function.

My invention also has special utility in reading out velocity in a system such as a precision integrating gyroscope accelerometer. In such a system the rotation of the sensitive axis is directly proportional to linear velocity. FIGURE 7 illustrates a system incorporating the concept of my invention for producing such a velocity readout. Only a multipole inductosyn 274 providing outputs on channels 270 and 272 need be used. Apparatus similar to that shown in FIGURE 1 is indicated by a block 276 for producing the tangent $n\theta$ function. This representation is fed to apparatus like that shown in FIGURE 2, indicated by the block 278 in FIGURE 7 to produce an ontput representation of $n\theta$. In FIGURE 7 I have also shown conductors 116 and 128 carrying, respectively, counts 1 and 2 of counter 42 and counts 3 and 4 of counter 42. I connect conductor 116 to trigger gates 280 to pass the two most significant bits of the previously calculated value of $n\theta$ to storage flip-flops 282. Conductor 128 is connected to actuate gates 284 to pass the two most significant bits of the newly calculated value of $n\theta$ to storage flip-flops 286.

An up-down counter 290 carries the initial velocity reading. I apply the outputs of flip-flops 282 and 286 to a subtracting circuit 288 similar to circuit 224 of FIGURE 2 adapted to produce outputs similar to those of circuit 224. I apply these output signal and those on conductors 116 and 128 to three-input AND circuits 292, 294, 296 and 298 to cause the circuits to actuate counter 290 to count up one or down one as required when the inductosyn output passes through zero in either direction. It will be apparent that the counter output terminals 302 and output terminals 304 to which the output channels of the block 278 are connected together provide an accurate digital indication of velocity.

In operation of the form of my invention shown in FIGURES 1 and 2 of the drawings, the resolver 14 and the inductosyn 22 produce output signals which are fed to the gates 32, 34, 36 and 38. The sampling signals produced by the scale-of-four counter 42 at the terminals 54 sequentially actuate these gates to pass the available signals to the voltage analogue-to-digital converter 40 which produces outputs in response to the signals. In accordance with the counter pulses at terminals 54 the outputs are stored in banks of flip-flops 68, 70, 72 and 74. At the same time the comparators 76 and 92 indicate respectively which of the resolver sine and cosine value is greater and which of the inductosyn sine and cosine value is greater. First, the sine and cosine values of the resolver are then gated to the storage flip-flops 118, 120, 122 and 124. In response to the signals on conductors 102 and 104 either a tangent or a cotangent function is calculated by the divider 138 and the look-up matrix gives the corresponding angular representation. It is to be noted that while I have shown only three bits in a practical embodiment of my system I generate a much larger number of bits such, for example, as nine bits.

At this point in the operation of my system I have available the representation of an angle of 45° or less together with a plurality of signals which in accordance with Table I above indicate which of eight sectors contains the correct angle and which signals can be used to indicate the operation which must be performed on the angular representation from the look-up device 158 to give the correct angle. Using all these samples in the logic circuitry shown in FIGURE 2, I am able to obtain a coarse representation of the angular position of shaft 10 from the resolver outputs. In a similar manner I employ the inductosyn voltages to give me a fine representation of angle in the storage circuits 222. These fine and coarse representations have sufficient redundancy to permit me to compare them to correct the redundancy in the manner outlined above to produce the desired accurate digital representation of angle at terminals 250.

In operation of the form of my invention shown in FIGURE 7 counter 290 carries the previous reading indicating velocity or an initial value. During counts 1 and 2 on conductor 116 the previously calculated value $n\theta$ passes through gates 280 to storage flip-flops 282. During counts 3 and 4 the newly calculated $n\theta$ value passs to storage flip-flops 286 through gates 284. Through the operation of the subtract circuit 288 and the logic circuits 292, 294, 296 and 298 I cause counter 290 to count up or down as required when the inductosyn output passes through zero. As a result terminals 302 and 304 carry an accurate digital representation of velocity.

It will be seen that I have accomplished the objects of my invention. I have provided a precision miniature analogue-to-digital converter for producing an accurate digital representation of the angular position of a shaft. My converter is extremely rapid in operation. The arrangement of the system is such that many of the components are time-shared. My converter employs no moving parts. It requires very little additional equipment over that available in the usual digital converter. I may use my converter to generate an accurate digital representation of velocity.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

As used in the specification the term "inductosyn" relates to apparatus for measuring angles such as shown in Childs Patent 2,671,892 or in Childs Patent 2,650,352.

Having thus described my invention, what I claim is:

1. An analogue-to-digital converter for producing a digital representation of the angular position of a shaft including in combination means for generating a signal representing the sine function of said shaft angular position, means for generating a signal representing the cosine function of said shaft angular position quotient producing, means responsive to said sine and cosine signals for producing a digital representation of the tangent function of said shaft angular position, and means responsive to said tangent function representation for producing the desired digital representation.

2. An analogue-to-digital converter for producing a digital representation of the angular position of a shaft including in combination means for generating a signal representing the sine function of said shaft angular position, means for generating a signal representing the cosine function of said shaft angular position, means responsive to said sine and cosine signals for producing a digital representation of the tangent function of said shaft angular position, means for producing signals determining the sector in which said shaft angular position lies, and means responsive to said tangent function representation and to said sector determining signals for producing the desired digital representation.

3. An analogue-to-digital converter for producing a digital representation of the angular position of a shaft including in combination means for generating a digital signal representing the sine function of said shaft angular position, means for generating a digital signal representing the cosine function of said shaft angular position, means responsive to said sine and cosine digital signals for producing a digital representation of the tangent function of said shaft angular position and means responsive to said tangent function representation for producing the desired digital representation.

4. An analogue-to-digital converter for producing a digital representation of the angular position of a shaft including in combination means for generating a signal representing the sine function of said shaft angular position, means for generating a signal representing the cosine function of said shaft angular position, means for producing a signal indicating the relative magnitudes of said sine and cosine signals, means for producing a first digital representation in accord with the sine signal including means for producing a signal indicating the sign of said sine signal, means for producing a second digital representation in accord with the cosine signal including means for producing a signal indicating the sign of the cosine signal, means responsive to said first and second digital representations and to said relative magnitude signal for dividing the smaller of said first and second digital representations by the larger to produce a ratio signal representing the tangent-cotangent function of said shaft angular position and means responsive to the ratio signal and the relative magnitude signal and the sine and cosine signals for producing the desired digital representation.

5. An analogue-to-digital converter for producing a precise digital representation of the angular position of a shaft including in combination a resolver having a shaft, a multipole resolver having a shaft, means for coupling said shafts, means for exciting said resolvers whereby said first resolver produces output signals in accordance with the sine and to the cosine of said shaft position angle and whereby said second resolver produces output signals in accordance with the sine and cosine of a multiple of said shaft position angle, means responsive to said first resolver output signals for producing a coarse digital representation of said shaft position angle, means responsive to said second resolver output signals for producing a fine digital representation of said shaft position angle and means responsive to the least significant bit of said coarse and most significant bit of said fine digital representations to produce the desired precise digital representation.

6. In an analogue-to-digital converter a multipole resolver having a pair of output windings
respective output amplifiers,
means for connecting said output windings to said output amplifiers,
a source of a calibrating signal,
means adapted to be actuated to apply said calibrating signal to said amplifiers,
means for actuating said actuable means to apply said calibrating signal to said amplifiers,
means for comparing the outputs of said amplifiers in response to said calibrating signal and means responsive to said comparing means for varying the gain of one of said amplifiers.

7. Apparatus including in combination
a multipole resolver having a shaft and respective windings adapted to produce output signals in accordance with the sine and the cosine of a multiple of the angular position of said shaft, means responsive to said output signals for generating a digital representation of said multiple of shaft position angle,
a counter for storing a digital representation of said multiple of said shaft position angle and means responsive to said digital representation producing means for actuating said counter.

References Cited by the Examiner

UNITED STATES PATENTS

| | | | |
|---|---|---|---|
| 2,966,672 | 12/1960 | Horn | 340—347.1 |
| 2,986,727 | 6/1961 | Macklem | 340—347 |
| 2,994,825 | 8/1961 | Anderson | 340—347.1 |
| 3,023,959 | 3/1962 | Rabin et al. | 340—347.3 |
| 3,028,550 | 4/1962 | Naydan et al. | 340—347 |
| 3,071,324 | 1/1963 | Schroeder et al. | 235—154 |

OTHER REFERENCES

IBM Technical Disclosure Bulletin, October 3, 1959, vol. 2, pages 18 and 19.

MAYNARD R. WILBUR, *Primary Examiner.*

MALCOLM MORRISON, *Examiner.*

K. R. STEVENS, *Assistant Examiner.*